United States Patent [19]

Matsushita et al.

[11] Patent Number: 4,696,863

[45] Date of Patent: Sep. 29, 1987

[54] BIOCAPSULE

[75] Inventors: Toshihiko Matsushita, Tokyo; Sadao Morishita, Ibaraki; Mikiya Sekine, Warabi; Shigetoshi Hiraishi, Tokyo, all of Japan

[73] Assignee: Mitsubishi Paper Mills, Ltd., Tokyo, Japan

[21] Appl. No.: 769,489

[22] Filed: Aug. 26, 1985

[30] Foreign Application Priority Data

Aug. 28, 1984 [JP] Japan ................................ 59-179938
Oct. 4, 1984 [JP] Japan ................................ 59-209450

[51] Int. Cl.[4] ............................................ B01J 13/02

[52] U.S. Cl. ............................ 428/402.2; 252/186.25; 264/4.3; 503/214; 424/455; 428/321.5; 428/402.22; 428/914; 430/138; 426/650; 426/651

[58] Field of Search ...................... 264/4.3; 428/402.2, 428/402.22, 321.5; 424/38, 455; 346/214

[56] References Cited

U.S. PATENT DOCUMENTS

| | | | |
|---|---|---|---|
| 3,432,327 | 3/1969 | Kan et al. | 428/402.2 X |
| 4,001,480 | 1/1977 | Shank | 428/402.2 X |
| 4,091,122 | 5/1978 | Davis et al. | 427/151 X |
| 4,588,639 | 5/1986 | Ozono | 428/402.22 |

*Primary Examiner*—Richard D. Lovering
*Attorney, Agent, or Firm*—Cushman, Darby & Cushman

[57] ABSTRACT

The present invention relates to a biocapsule comprising a microorganism and useful substances captured by said microorganism and confined therein. This biocapsule has applications such as heat-sensitive recording papers and the like.

16 Claims, No Drawings

BIOCAPSULE

BACKGROUND OF THE INVENTION

1. Field of the Invention

This invention relates to a so-called biocapsule obtained by allowing a microorganism to capture useful substances and confine them therein.

2. Description of the Invention

So-called microcapsules consist of a liquid, solid or gas in the form of fine particle of 1 μm to several hundreds μm and a thin film covering the fine particle and having a thickness of several mμm to several μm. Since the first disclosure in U.S. Pat. Nos. 2,711,376 and 2,712,507, these microcapsules have been used in various applications. Their most common application is pressure-sensitive recording papers. In this application, microcapsules containing a color former solution obtained by dissolving a colorless, electron-donating dye precursor (color former) in a non-volatile solvent are coated on the back side of a substrate to form an upper paper; a colorless, electron-accepting acidic substance (color developer) is coated on the top side of another substrate to form a lower paper; these two papers are superimposed so that the coated sides face each other; and manual writing or typing is applied onto these papers from the side of the lower paper, whereby the microcapsules are broken, the microcapsule contents are released, the color former and the color developer contact with each other to cause a chemical reaction, and a colored substance is formed on the surface of the lower paper as a copy image. Thus, in microcapsules, useful substances having particular properties are confined in a thin film; therefore, even their particular properties can be simultaneously confined, and the substances can be taken out whenever necessary by breaking the thin film.

Two substances reactive to each other can be separated by way of microencapsulation and accordingly can be stored together over a long period of time without causing any reaction, and their reaction can be started only by breaking their microcapsules. Having such favorable functions, microcapsules have been extensively used in applications such as recording materials, medicines, foods, cosmetics, adhesives, agricultural chemicals, artificial internal organs and the like.

The microcapsules used in the above applications are produced in accordance with encapsulation processes such as coacervation process, interfacial polymerization process, in situ process, spray drying process, curing-in-liquid process and the like and their wall membranes are composed of gelatin or a synthetic resin.

In constrast to the above encapsulation processes, there is an encapsulation process using, as a wall membrane, a completely different material, namely, a microorganism. Capsules produced according to this process are called biocapsules or microorganism capsules. Biocapsules are disclosed in, for example, U.S. Pat. No. 4,001,480, Japanese Patent Application Kokai (Laid-open) No. 107,189/1983, etc. U.S. Pat. No. 4,001,480 suggests a process for preparing an encapsulated cosmetic by contacting fat-soluble substances with an Eumycete containing a very large amount of natural fats. According to this patent, said substances must be soluble in the natural fats or lipids of said Eumycete and further the Eumycete must contain natural fats in an amount of about 40 to 60% by weight. Furthermore, the Eumycete used is limited to grown Eumycetes, namely, Eumycetes having a propagative ability. Japanese Patent Application Kokai (Laid-open) No. 107,189/1983 suggests an encapsulation process wherein a grown microorganism containing lipids in an amount of 10% by weight or more (e.g. a fat yeast, a beer yeast or the like) is treated an organic substance for increasing lipids in said microorganism (e.g. an aliphatic alcohol, an ester, an aromatic hydrocarbon, a hydrogenated aromatic hydorcarbon or the like) to allow said microorganism to ingest and stably contain the organic substance. The grown microorganism used above refers to a microorganism recovered from the culture medium and preferably contains a considerable amount of lipids, particularly 10% by weight or more and, for example, 20 to 35% by weight.

Thus, the microorganism used in Japanese Patent Application Kokai (Laid-open) No. 107,189/1983 is a grown microorganism, namely, an organism having a propagative ability and must contain lipids in an amount of 10% by weight or more, preferably 20 to 35% by weight or 40 to 60% by weight. This requires a prodigious labor for maintenance and storage of microorganism as well as a care for maintenance of lipid content in microorganism.

Hence, it has been desired to develop a process for producing more easily and at a lower cost a pressure-sensitive biocapsule which can preferably used in pressure-sensitive recording papers, medicines, foods, cosmetics, adhesives, perfumes, catalysts, agricultural chemicals, etc.

Meanwhile, there are photohardenable microcapsules. In these microcapsules, microcapsule breakability necessary for releasing the contents can be controlled to any desired level, for example, unbreakable, partially breakable or totally breakable.

The photohardenable microcapsules contain, as major components, a photohardenable resin and a photopolymerization initiator and the breakability of the microcapsules is controlled by the amount of light applied thereto.

The present inventors previously disclosed a photohardenable microcapsule in Japanese Patent Application Kokai (Laid-open) No. 14,943/1983, wherein there were mentioned, as the microencapsulation process for said photohardenable microcapsule, the phase separation process (U.S. Pat. Nos. 2,800,457 and 2,800,458), the interfacial polymerization process (Japanese Patent Publication Nos. 19,574/1963, 446/1967 and 771/1967), the in situ process based on monomer polymerization (Japanese Patent Publication No. 9,168/1961 and Japanese Patent Application Kokai (Laid-open) No. 9,097/1976), the melting-dispersion-cooling process (UK Pat. Nos. 952,807 and 965,074) and the spray drying process (U.S. Pat. No. 3,111,407 and UK Pat. No. 930,422), which were all known at that time.

The above mentioned microencapsulation processes for photohardenable microcapsules, however, have drawbacks such as, for example, use of costly membrane materials, need of polymerization, complicated production process and high cost of produced microcapsule. Therefore, it has been awaited to produce photohardenable microcapsules using the previously mentioned bioencapsulation process because such production will not only have no drawback as mentioned above but also provide a big economical advantage.

SUMMARY OF THE INVENTION

An object of the present invention is to provide a biocapsule which can be produced by using low cost materials and a simple process.

Another object of the present invention is to provide a pressure-sensitive biocapsule which can preferably be used in pressure-sensitive recording papers, medicines, foods, cosmetics, adhesives, perfumes, catalysts, agricultural chemicals, etc.

Still another object of the present invention is to provide a photohardenable biocapsule whose breakability can be controlled to any desired level such as unbreakable, partially breakable or totally breakable.

The present inventors found that the above objects are achieved by a biocapsule comprising an Eumycete and one member selected from the group consisting of (1) a hydrophobic substance or a hydrophilic substance and (2) a photohardenable resin and a photopolymerization initiator, captured by said Eumycete and confined therein.

Accordingly, the present invention resides in a biocapsule comprising an Eumycete and one member selected from the group consisting of (1) a hydrophobic substance or a hydrophilic substance and (2) a photohardenable resin and a photopolymerization nitiator, captured by said Eumycete and confined therein.

PREFERRED EMBODIMENTS OF THE INVENTION

The biocapsule according to the present invention can be obtained by allowing an Eumycete to capture and confine therein (1) a hydrophobic substance or a hydrophilic substance, or (2) a photohardenable resin and a photopolymerization initiator. Hence, each of the two biocapsules containing the substance (1) or the substances (2) will be explained below.

(A) Biocapsule containing a hydrophobic substance or a hydrophilic substance

This biocapsule can be obtained by allowing an Eumycete to capture a hydrophobic substance or a hydrophilic substance into its cells by diffusion action through the cell walls without breaking the cell walls. In conventional techniques, only grown microorganisms having a propagative ability have been used for this purpose. However, the present inventors found that not only a grown Eumycete but also a dead Eumycete having no propagative ability such as, for example, a dry yeast subjected to a severe heat treatment can effectively capture and confine a hydrophobic substance or a hydrophilic substance in their cells. The present inventors further found that even an Eumycete whose lipid content is less than 10% by weight, for example, 1 to 3% by weight as compared with 10% by weight or more [Japanese Patent Application Kokai (Laid-open) No. 107,189/1983] or 40 to 60% by weight (U.S. Pat. No. 4,001,480) both used conventionally, can confine a hydrophobic substance or a hydrophilic substance with a satisfactory efficiency.

The present inventors furthermore found to a surprise that a dead Eumycete containing a certain amount of lipids can capture a hydrophobic substance or a hydrophilic substance in a shorter time than an Eumycete having a propagative ability and containing the same amount of lipids.

Usability of a dead Eumycete allows for handling of Eumycete even under an environment where sundry bacteria are present in large amounts, while Eumycetes having a propagative ability must be stored in a completely closed system or low temperatures.

In addition, usability of an Eumycete containing a small amount of lipids allows for use of commercially available Eumycetes of easy access and low cost, such as a baker's yeast, a beer yeast, a food and fodder yeast and the like.

Specific examples of the Eumycete usable in the present invention will be mentioned below.

According to the classification of Eumycetes, there are two groups of yeasts, namely, Saccharomycetaceae belonging to Ascomycetes and Cryptococcaceae forming no spore and belonging to *Fungi imperfecti*, Saccharomycetaceae have Saccharomycetoideae subfamily and Lipomycetoideae subfamily. The former subfamily has Saccharomyceteae tribe (divided into Saccharomyces genus, Schwaniomyces genus, Debaryomyces genus, Saccharomycopsis genus, etc.) and Nadosoneae tribe (divided into Saccharomycodes genus, etc.). The latter subfamily has Lipomyces genus.

Cryptococcaceae have Cryptococcoideae subfamily and Trichosporoideae subfamily. The former subfamily has Cryptococcus genus, Brettanomyces genus, Candida genus, Kroeckera genus, etc. The latter subfamily has Trichosporon genus.

More specifically, there can be mentioned *S. cervisiae, S. rouxii* and *S. carlsbergensis* belonging to Saccharomyces genus; *E. vernalis* belonging to Endomyces; *L. lipofer* and *L. starkeyi* belonging to Lipomyces genus; *T. pullulans* and *T. cutaneum* belonging to Trichosporon genus; *C curvata, C. utillis, C. tropicalis,* and *C. flaveri* belonging to Candida genus; and *R. glutinis* belonging to *Rodotorula genus.* These illustrative yeasts vary in lipid content. Some of these are so-called fat-rich yeasts containing a large amount of lipids and others are low in lipid content. For all these yeasts, a dead yeast can be used. When an yeast has a lipid content of less than 10% by weight, the yeast can be used for production of biocapsule regardless of whether it is dead or has a propagative ability.

The yeasts usable in the present invention have various shapes such as egg shape, circular shape, lemon shape, columnar shape, oval shape and the like. A circular, oval or egg shape is preferred. Each yeast has its own particle diameter; however, a diameter of 5 to 20 μm is preferable.

The temperature adopted in encapsulation is 35° to 75° C., preferably 40° to 60° C. The time required for encapsulation is 30 min or more but it can be varied depending upon the amount of substances to be captured and confined. The weight ratio of substances to be captured and confined to yeast is 2 or less, preferably 1 or less.

Next, the hydrophobic substance or the hydrophilic substance used will be explained specifically.

Specific examples of the hydrophobic substance include an ordinarily colorless or light colored, electron-donating dye precursor, namely, a color former and an electron-accepting color developer, both used in pressure-sensitive recording papers.

As the dye precursor, there are mentioned triphenylmethane compounds, fluoran compounds, diphenylmethane compounds, thiazine compounds, spiropyran compounds, etc. Specifically there are mentioned Crystal Violet Lactone, 3-diethylamino-7-methylfluoran, 3-diethylamino-6-chloro-7-methylfluoran, 3-diethylamino-6-methyl-7-chlorofluoran, 3-diethylamino-7-anilinofluoran, 3-diethylamino-7-(2-chloroanilino)fluoran, 3-dibutylamino-7-(2-chloroanilino)fluoran, 3-diethylamino-7-(3-chloroanilino)fluoran, 3-diethylamino-6-methyl-7-anilinofluoran, 3-(N-ethyl-p-toluidino)-6-methyl-7-anilinofluoran, 3-(N-methylcyclohexylamino)-3-methyl-7-anilinofluoran, 3-piperidino-3-methyl-7-anilinofluoran, etc.

As the electron-accepting color developer, there are mentioned inorganic acidic substances such as acid clay, active clay, kaolin, zeolite, bentonite and the like; substituted phenol compounds such as p-cresol, p-octylphenol, p-cyclohexylphenol, p-phenylphenol, a-naphthylphenol, cumyl phenol, p-chlorophenol and the like; phenol resin compounds such as a phenol-formalin condensate, a substituted phenol-formalin condensate and the like; metal-modified phenol resin compounds obtained by modifying the above mentioned phenol resin compounds with a polyvalent metal such as zinc, nickel or the like; aromatic carboxylic acid compounds such as p-butylbenzoic acid, p-hydroxybenzoic -hydroxybenzoic acid, 2,5-dihydroxybenzoic acid, salicylic acid, 5-tert-butylsalicylic acid, 3,5-di-tert-butylsalicylic acid, 3,5-di($\alpha$-methylbenzyl)salicylic acid and the like; and metal (polyvalent metal such as zinc, nickel or the like) salts of the above mentioned aromatic carboxylic acid compounds; mixtures between an aromatic carboxylic acid compound and a polyvalent metal compound such as zinc acetate, zinc propionate or the like; and so forth.

The dye precursor (color former) and the color developer are desirably used in a solution in an organic solvent, particularly a high boiling solvent. However, they may be used in the form of fine dispersion. The high boiling solvent can be same as those used in ordinary pressure-sensitive recording papers, and there can be mentioned, for example, aromatic compounds (e.g. alkylnaphthalenes, alkyldiphenylalkanes, alkylbiphenyls), esters (e.g. phthalic acid esters, glycol esters), chlorinated paraffins, toluene, xylene, linseed oil, cotton seed oil, etc.

As the hydrophilic substance, there can be mentioned, for example, water-soluble substances for chelate reaction consisting of a ligand and a metal compound. Specific examples include tannic acid plus ammonium metavanadate, tannic acid plus iron alum and phthalonitrile plus copper sulfate.

As the hydrophobic substance or the hydrophilic substance, there can further be mentioned perfumes, adhesives, medicines, catalysts, insecticides, foods, cosmetics, etc. As the solvent for these substances, there can be mentioned, in addition to the above mentioned high boiling solvents, primary alcohols (e.g. methanol, ethanol, butanol), secondary alcohols (e.g. isobutanol), tertiary alcohols (e.g. t-butanol), glycols (e.g. diethylene glycol), esters (e.g. ethyl acetate, 2-ethylhexyl acetate, di-2-ethylhexyl adipate), ketones (e.g. acetone, methyl ethyl ketone), aromatic hydrocarbons (e.g. benzene, toluene, xylene), aliphatic hydrocarbons (e.g. benzine, petroleum, mineral spirit), etc. The boiling point of the solvent can vary widely from a low boiling point to a high boiling point.

(B) Biocapsule containing a photohardenable resin and a photopolymerization initiator This photohardenable biocapsule can be obtained by allowing an Eumycete to capture a mixture mainly comprising a photohardenable resin and a photopolymerization initiator into its cells by diffusion action through the cell walls without breaking the cell walls. With respect to the Eumycete used for this purpose, it has been found that even an Eumycete containing a low amount of lipids, namely, less than 10% by weight can capture and confine the above mixture.

As a matter of course, an active Eumycete having a propagative ability can be used. Surprisingly, it has been found that even a dead and inactive Eumycete having no propagative ability can capture and confine a photohardenable resin and a photopolymerization initiator and yet can do it in a shorter time. This is advantageous because no strict care is required for storage of a dead and inactive Eumycete while an Eumycete having a propagative ability must be stored in a closed system and at low temperatures to maintain its function.

Specific examples of the Eumycete used in production of this biocapsule are same as those used in production of the previously mentioned biocapsule (A) containing a hydrophobic substance or a hydrophilic substance.

The photohardenable biocapsule using an yeast will be explained in more detail.

Since this biocapsule comprises (a) an yeast and (b) a photohardenable resin and a photopolymerization initiator, both captured by said yeast and confined therein, its breakability can be controlled to any desired level by adjusting the amount of light applied to the biocapsule. When the release of biocapsule contents is required, a pressure, a heat or the like is applied to the biocapsule from outside as in cases of ordinary microcapsules, to break the cell wall and release the contents. When the biocapsule contents need be confined for ever, a light is applied to the biocapsule. The light passes through the cell wall and hardens the photohardenable resin and changes it to a hard resin. As a result, the photohardenable biocapsule becomes a rigid capsule which, even when receives an impact or the like from outside, causes no breakage and accordingly no contents release. With this photohardenable biocapsule, it is also possible to control the release of contents to any desired level by adjusting the amount of light applied.

The photohardenable biocapsule of the present invention must contain a photohardenable resin and a photopolymerization initiator. The biocapsule can contain other desired organic or inorganic substances in a solid or liquid form. These substances are not particularly restricted and include agricultural chemicals, foods, cosmetics, catalysts, adhesives, curing agents, oxidants, reductants, dyes, pigments, plasticizers, high molecular coagulants, rust preventives, anti-oxidants and soil improvers.

The photohardenable biocapsule can be extensively used in various application fields. For example, the photohardenable biocapsule can be used as a photosensor. In this application, the photohardenable biocapsule is allowed to contain a reactive substance as one component of the capsule contents. The photohardenable biocapsule is coated on a substrate. The coated substrate is exposed to a light, whereby the photohardenable biocapsule hardens to a level proportional to the amount of light applied. This substrate is then superimposed on another substrate coated with a coreactive substance capable of developing a color by reacting with the above reactive substance, in such a way that the coated sides of the two substrates face each other. A given pressure is applied onto these substrates to develop a color. Since the density of this color is determined by the amount of light applied, the density can be used to examine the amount of light applied. The photohardenable biocapsule can also be used in copying materials. In this application, the photohardenable biocapsule is allowed to contain a reactive substance as one component of the contents. The photohardenable capsule is coated on a substrate. On the coated substrate is superimposed an original image and they are exposed to a light. At the portion of the coated substrate corresponding to the image portions of the original copy, capsules remain unchanged because the light does not pass through or does not reflect, but at other portions of the coated substrate, capsules harden from inside because these capsules receive the light. Subsequently, the original copy is removed and the coated substrate is superimposed on an image-forming sheet coated with a coreactive substance. They are pressed to develop a copy image on the image-forming sheet. In this way, one or more copy image can be obtained. Of course, the photohardenable biocapsule can be used in various other applications as long as the function of the biocapsule is utilized.

As the photohardenable resin contained in the photohardenable biocapsule, there can be used, with no particular restriction, a photodimerizable resin having a photosensitive group such as cinnamic acid residue, cinamylidene residue, $\alpha,\beta$-unsaturated ketone residue, coumarin residue, anthracene residue, $\alpha$-phenylmaleimide residue, benzophenone residue, stilbene residue or the like; a photodecomposable resin having a photosensitive group such as diazonium salt residue, quinone diazide residue, azide residue, dithiocarbamate residue, benzoin residue or the like; a photopolymerizable resin having an acryloyl group, an allyl group, a vinyl group, an epoxy group or the like; and so forth. Of these, a photopolymerizable resin is particularly effective. With respect to the form of the photohardenable resin used, a liquid form is advantageous.

As the photopolymerization initiator used for polymerization of the photohardenable resin, known and ordinarily employed compounds can be used such as, for example, a benzoin alkyl ether, benzophenone, a Michler's ketone, a thioxanthone, acetophenone and the like. As necessary, the photohardenable biocapsule can further contain an auxiliary photosensitizer capable of widening a wavelength range in which a photopolymerization initiator used is sensitive, such as anthraquinone, 5-nitrofluorene or the like; a stabilizer for enhancing the storability of photohardenable biocapsule, such as a radical polymerization initiator or the like; a modifier; a diluent such as an oligomer or monomer of relatively low molecular weight or the like; and so forth. For improvement of solubility of these substances, the photohardenable biocapsule can further contain, as a dissolution aid, an organic solvent such as, for example, an alkylnaphthalene, an alkylbiphenyl, an alkylidenebiphenyl, an ester or the like. However, use of this organic solvent in a large amount is not appropriate because it adversely affects the hardenability of photohardenable biocapsule.

As the light for hardening the photohardenable biocapsule, an ultraviolet light is generally used.

As the light source, there are used sunlight, a xenon lamp, a low or high pressure mercury lamp, etc. Even if the photohardenable biocapsule is exposed to an indoor lamp or an indirect sunlight or the like during its production or ordinary handling, the biocapsule hardly reduces its characteristic properties.

The present invention will be explained in more detail below referring to Examples; however, the invention is not restricted to these Examples.

EXAMPLES

Examples of production of pressure-sensitibe biocapsules using a hydrophobic substance or a hydrophilic substance.

EXAMPLE 1

In 420 parts of water containing 0.25% of a surfactant [ADEKATOL LO-15 (brand name), manufactured by ASAHI DENKA KOGYO K.K.] was emulsified 80 parts of a dye solution obtained by dissolving 5% by weight of 3-diethylamino-6-methyl-7-phenylaminofluoran in HISOL SASN-296 (a diarylethane type solvent, manufactured by Nippon Petrochemicals Co., Ltd.), using a homogenizer so as to give an emulsion having particle diameters of about 1 $\mu$m. The resulting emulsion was kept in a constant temperature bath of 50° C. and stirred with a stirrer until the emulsion temperature reached 50° C.

Separately, 100 parts of dry and dead *Saccharomyces certisiae* (baker's yeast) were weighed and added gently to the emulsion kept at 50° C., with stirring. Incidentally, the yeast used contained about 9% by weight of lipids.

In 30 min after the addition, a sample was taken and observed under an optical microscope. In the center of each yeast cell, there could be seen brilliant spheres. At this stage, however, emulsion particles were also observed. Stirring was conducted for further 3 hr and the mixture was allowed to cool. A new sample was again observed under the optical microscope. Compared with the case of the sample of 30 min after the addition, in the new sample there were larger brilliant spheres in the center of each yeast cell and no emulsion particle was found.

To 40 parts of this aqueous dispersion of pressure-sensitive biocapsules containing a dye solution were added 15 parts of an aqueous solution containing 10% of a polyvinyl alcohol and 20 parts of water. This mixture was stirred thoroughly and coated on a base paper of 50 g/m$^2$ using a Meyer bar.

The coated paper was superimposed on a lower paper (Mitsubishi NCR Lower Paper, manufactured by Mitsubishi Paper Mills Ltd.). Typewriting was applied for these papers from the side of the coated paper using an IBM 82C typewriter at a typing pressure of No. 5, whereby a clear black image was formed on the lower paper.

EXAMPLE 2

Tests were conducted in the same manner as in Example 1 except that the *S. cervisiae* used in Example 1 was replaced by the following dead yeasts having the following lipid contents.

| Yeast | Lipid content in dry and solid yeast, % by weight |
|---|---|
| *Saccharomyces cervisiae* | 2.0 |
| " | 6.9 |
| " | 14.9 |
| *Torulopsis utilis* | 6.4 |
| " | 8.0 |

In all the yeasts, brilliant spheres could be observed in a short length of time. Using these biocapsules, pressure-sensitive recording papers were In Table 1 was shown a relation between times of flash light applied and density of red color developed on image-forming paper. prepared. They could form a satisfactory image.

EXAMPLE 3

A pressure-sensitive biocapsule containing a peppermint oil (menthol oil) was prepared in the same manner as in Example 1 except that 80 parts of the dye solution used in Example 1 and obtained by dissolving 5% by weight of 3-diethylamino-6-methyl-7-phenylaminofluoran in HISOL SAS N-296 was replaced by 80 parts of the peppermint oil. This biocapsule was made into an aqueous dispersion. The dispersion was coated on a base paper of 50 $g/m^2$ using a Meyer bar. The biocapsule on the coated paper was crushed by nails and smelled. An odor of menthol was felt, whereby the presence of menthol within the biocapsule could be ascertained.

Examples of production of photohardenable biocapsules using a photohardenable resin and a photopolymerization initiator

EXAMPLE 4

In 450 parts of water containing 0.25% of a surfactant [ADEKATOL LO-15 (brand name), manufactured by ASAHI DENKA KOGYO K.K.] was emulsified a mixture of 80 parts of an epoxy acrylate type photohardenable resin [RIPOXY (brand name), manufactured by Showa Highpolymer Co., Ltd.] and 0.2 part of benzoin ethyl ether, using a homogenizer so as to give an emulsion having particle diameters of about 1 μm. The resulting emulsion was kept in a constant temperature bath of 50° C. and stirred with a stirrer until the emulsion came to have a temperature of 50° C.

Separately, 100 parts of dry and inactive *Saccharomyces cervisiae* having no propagative ability (baker's yeast) was weighed and gently added to the above emulsion maintained at 50° C., with stirring. Incidentally, the yeast used had a lipid content of about 9% by weight.

In 30 min after the addition, a sample was taken and observed under an optical microscope. In the center of each yeast cell, there could be seen brilliant spheres. At this stage, however, emulsion particles were also observed. Stirring was conducted for further 3 hr and the mixture was allowed to cool. A new sample was again observed under the optical microscope. Compared with the case of the sample of 30 min after the addition, in the new sample there were larger brilliant spheres in the center of each yeast cell and no emulsion particle was found.

To 60 parts of the aqueous dispersion of photohardenable biocapsules obtained above were added 20 parts of an aqueous solution containing 10% of a polyvinyl alcohol and 20 parts of water. They were mixed thoroughly and then coated on a base paper of 50 $g/m^2$ using a Meyer bar.

On a part of the coated side of the coated paper thus prepared was placed a black paper. Then, a xenon light was applied five times to the coated paper from its coated side using a Risoxenofax FX-150. The black paper was removed and the coated paper was passed through a press roll. Subsequently, both the exposed part and the non-exposed part of the coated paper were observed under an electron microscope, whereby it was ascertained that the capsules in the exposed part were not broken and retained a spherical shape but the capsules in the non-exposed part were all broken.

EXAMPLE 5

Encapsulation was conducted in the same manner as in Example 1 except that dry and active *Saccharomyces cervisiae* having a propagative ability (baker's yeast) was used. However, it took 5 hr until no emulsion until no emulsion particle was seen and brilliant spheres could be observed in the center of each yeast cell.

In the same manner as in Example 4, unbreakability of the capsules in the exposed part could be ascertained.

EXAMPLE 6

In Examples 4 and 5, the properties of photohardenable biocapsules prepared were affirmed with an electron microscope. In this Example, the properties of the biocapsule according to this invention were affirmed visually by allowing the biocapsule to contain a colorless dye.

A dispersion of photohardenable biocapsules was prepared in the same manner as in Example 4 except that the mixture used in Example 4 consisting of 80 parts of an epoxy acrylate type photohardenable resin and 0.2 part of benzoin ethyl ether was replaced by a mixed solution consisting of 80 parts of an oligoester acrylate type photohardenable resin [ARONIX (brand name), manufactured by Toa Gosei Chemical Industry Co., Ltd.], 3 parts of Crystal Violet Lactone and 0.2 part of benzoin ethyl ether. To 60 parts of the above dispersion were added 20 parts of an aqueous solution containing 10% of a polyvinyl alcohol and 20 parts of water. The mixture was stirred thoroughly and then coated uniformly on a paper of 50 $g/m^2$ using a Meyer bar. Onto the coated side of this photohardenable biocapsule paper was applied a flash of a xenon light from 1 to 5 times using a Risoxenofax FX-150. Then, the resulting paper was superimposed on an image-receiving paper coated with a dispersion of zinc 3,5-di-tert-butylsalicylate so that their coated sides face each other. They were pressed over the entire surface by a press roll, whereby the coated side of the image-receiving paper developed a red color whose density was different depending upon the times of flash light applied.

TABLE 1

| Times of flash light applied | Density of red color on image-receiving paper |
|---|---|
| No flash light applied | 0.80 |
| 1 | 0.48 |
| 2 | 0.20 |
| 3 | 0.11 |
| 4 | No color development |
| 5 | Same as above |

As is obvious from Table 1, photohardenable biocapsules containing a reactant, when receiving no light, are broken completely and develop a color of high density on an image-receiving paper. However, with the increase of times of flash light applied, hardening of biocapsules progresses, the number of biocapsules broken decreases, and the density of color developed is reduced. When the times of flash light applied reach a certain point, the biocapsules harden completely becoming rigid capsuls which are unbreakable. In this case, no color can be developed on the image-receiving paper.

As appreciated from above, biocapsule of this invention uses an Eumycete, particularly an yeast, preferably a dead yeast. Therefore, the present biocapsule can be prepared using low cost materials and according to a simple process. By altering substances to be confined therein to best meet an intended application, the biocapsule of this invention find extensive usages and accordingly has a high industrial value.

What is claimed is:

1. A biocapsule comprising an Eumycete and at least one member selected from the group consisting of (1) a hydrophobic substance or a hydrophilic substance and (2) a photohardenable resin and a photopolymerization initiator, captured by said Eumycete and confined therein, said Eumycete containing lipids in an amount of less than 10% by weight.

2. A biocapsule according to claim 1 comprising a dead Eumycete and a hydrophobic substance or a hydrophilic substance captured by said Eumycete and confined therein.

3. A biocapsule according to claim 2, wherein the Eumycete is an yeast.

4. A biocapsule according to claim 3 wherein the Eumycete contains lipids in an amount of 1 to 3% by weight.

5. A biocapsule according to claim 4 wherein the hydrophobic substance is an electron-donating color former (a dye precursor) or an electron-accepting color developer for use in heat-sensitive recording paper.

6. A biocapsule according to claim 2, wherein the Eumycete contains lipids in an amount of 1 to 3% by weight.

7. A biocapsule according to claim 6 wherein the hydrophobic substance is an electron-donating color former (a dye precursor) or an electron-accepting color developer for use in heat-sensitive recording paper.

8. A biocapsule according to claim 6 wherein the hydrophilic substance is water-soluble substances for chelate reaction consisting of a ligand and a metal chelate.

9. A biocapsule according to claim 8 wherein the Eumycete is a yeast.

10. A biocapsule according to claim 9 wherein the Eumycete contains lipids in an amount of 1 to 3% by weight.

11. A biocapsule according to claim 1, wherein the hydrophobic substance is an electron-donating color former (a dye precursor) or an electron-accepting color developer for use in heat-sensitive recording paper.

12. A biocapsule according to claim 1, wherein the hydrophilic substance is water-soluble substances for chelate reaction consisting of a ligand and a metal chelate.

13. A biocapsule according to claim 1 comprising (a) a dead Eumycete and (b) a photohardenable resin and a photopolymerization initiator both captured by said Eumycete and confined therein.

14. A biocapsule according to claim 13, wherein the Eumycete is an yeast.

15. A biocapsule according to claim 1, wherein the contents are capable of being released by applying pressure.

16. A biocapsule according to claim 1, wherein the contents are capable of being released by applying heat.

* * * * *